United States Patent
Morris

(10) Patent No.: US 10,336,412 B2
(45) Date of Patent: Jul. 2, 2019

(54) ADJUSTABLE AREA KITE OR WING

(71) Applicant: Clayton Morris, Monroeville, PA (US)

(72) Inventor: Clayton Morris, Monroeville, PA (US)

( * ) Notice: Subject to any disclaimer, the term of this patent is extended or adjusted under 35 U.S.C. 154(b) by 291 days.

(21) Appl. No.: 15/282,222

(22) Filed: Sep. 30, 2016

(65) Prior Publication Data

US 2017/0096211 A1    Apr. 6, 2017

Related U.S. Application Data

(60) Provisional application No. 62/235,948, filed on Oct. 1, 2015, provisional application No. 62/262,234, filed on Dec. 2, 2015.

(51) Int. Cl.
*B64C 31/06*    (2006.01)
*B63B 35/79*    (2006.01)

(52) U.S. Cl.
CPC .......... *B63B 35/7976* (2013.01); *B64C 31/06* (2013.01); *B64C 2031/065* (2013.01)

(58) Field of Classification Search
CPC . B64C 31/06; B64C 2013/065; B64C 31/036; B64C 31/028; B63B 35/7976; A63H 27/085
See application file for complete search history.

(56) References Cited

U.S. PATENT DOCUMENTS

| | | |
|---|---|---|
| 3,494,578 A | 2/1970 | Cureton |
| 3,534,931 A | 10/1970 | Rogallo |
| 3,949,519 A | 4/1976 | Meyer |
| 5,052,641 A | 10/1991 | Coleman |
| 5,556,057 A | 9/1996 | Davies |
| 5,727,756 A | 3/1998 | Rowe |
| 5,938,150 A | 8/1999 | King |
| 6,241,195 B1 | 6/2001 | Wagner |
| 6,705,568 B2 | 3/2004 | Lee |
| 6,845,948 B2 | 1/2005 | Paul |
| 6,899,298 B2 | 5/2005 | Lee |
| 7,104,504 B2 | 9/2006 | Peterson |
| 7,377,470 B2 | 5/2008 | Miyake |
| 7,503,527 B1 | 3/2009 | Fairchild |
| 7,621,485 B2 | 11/2009 | Logosz |
| 7,780,120 B1 | 8/2010 | Fairchild |
| 8,096,510 B2 | 1/2012 | Shogren |
| 8,573,540 B2 | 11/2013 | Jerome |
| 8,651,431 B1 | 2/2014 | White |
| 8,919,701 B2 | 12/2014 | Salles |
| 2011/0052391 A1 | 3/2011 | Specht |
| 2015/0014487 A1 | 1/2015 | Rudolf |

FOREIGN PATENT DOCUMENTS

| | | |
|---|---|---|
| CN | 203710689 | 7/2017 |
| DE | 20201924 | 7/2002 |
| DE | 102005002941 | 7/2006 |

(Continued)

*Primary Examiner* — Philip J Bonzell
(74) *Attorney, Agent, or Firm* — Bartony & Associates, LLC.

(57) ABSTRACT

A kite includes a frame including a leading edge support and a plurality of struts extending rearward from the leading edge support, a flexible main canopy attached to the frame and at least one flexible kite sizing section adjustably attached to the flexible main canopy. The at least one flexible kite sizing section is adjustable to change an area of the kite, including an area of at least a first wing tip section of the kite.

17 Claims, 10 Drawing Sheets

(56) References Cited

FOREIGN PATENT DOCUMENTS

| | | |
|---|---|---|
| DE | 202007007804 | 1/2008 |
| DE | 102008039434 | 3/2010 |
| DE | 102010052081 | 5/2012 |
| EP | 0635290 B1 | 12/1996 |
| JP | 05031259 A | 2/1993 |
| KR | 200123525 | 10/1998 |
| WO | WO1999059866 | 11/1999 |
| WO | WO03076266 A2 | 9/2003 |
| WO | WO2015145363 | 10/2015 |
| WO | WO2017059275 | 4/2017 |

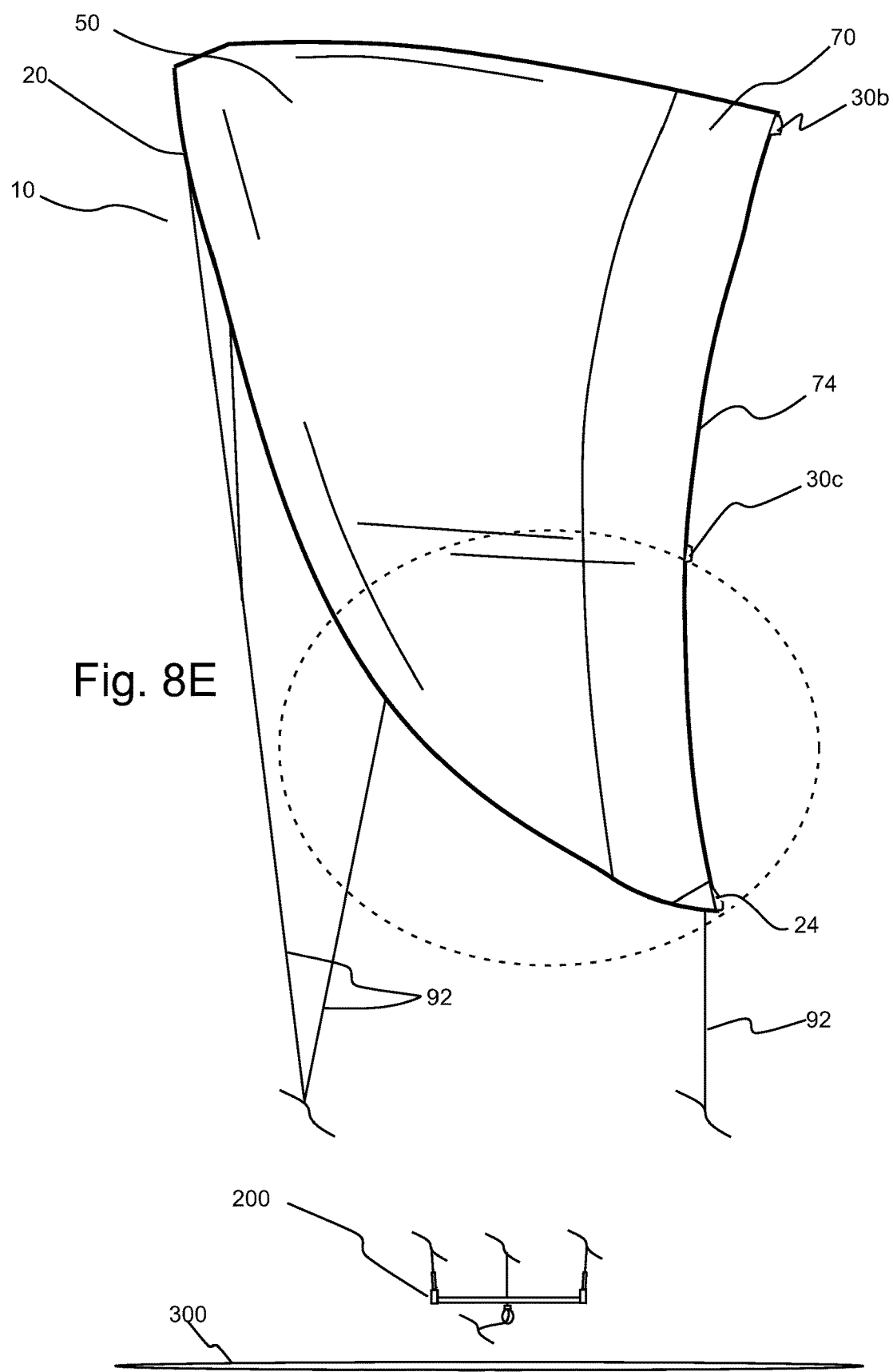

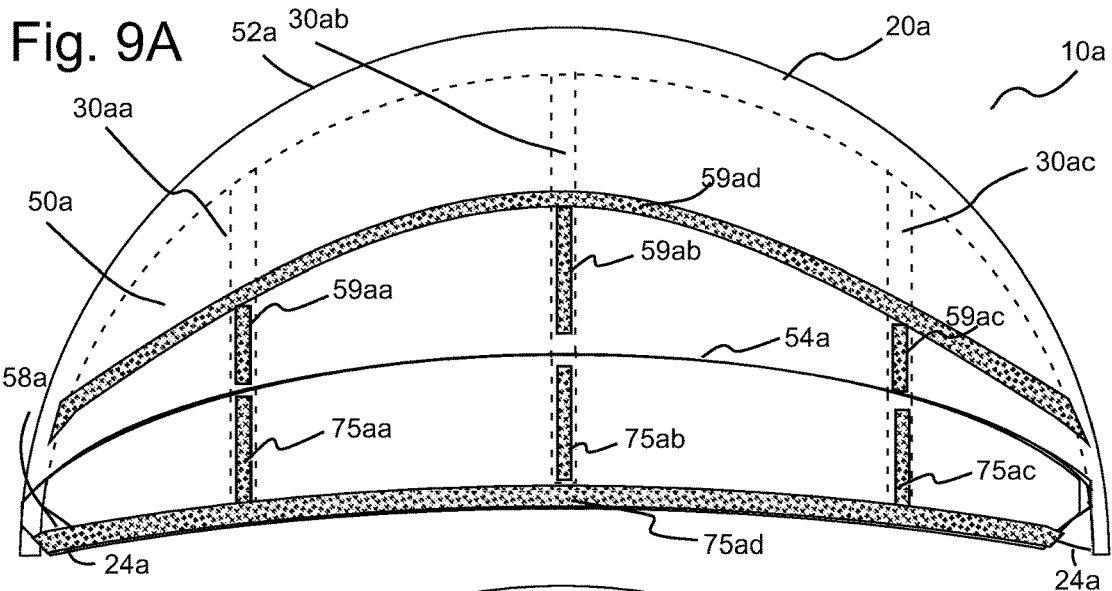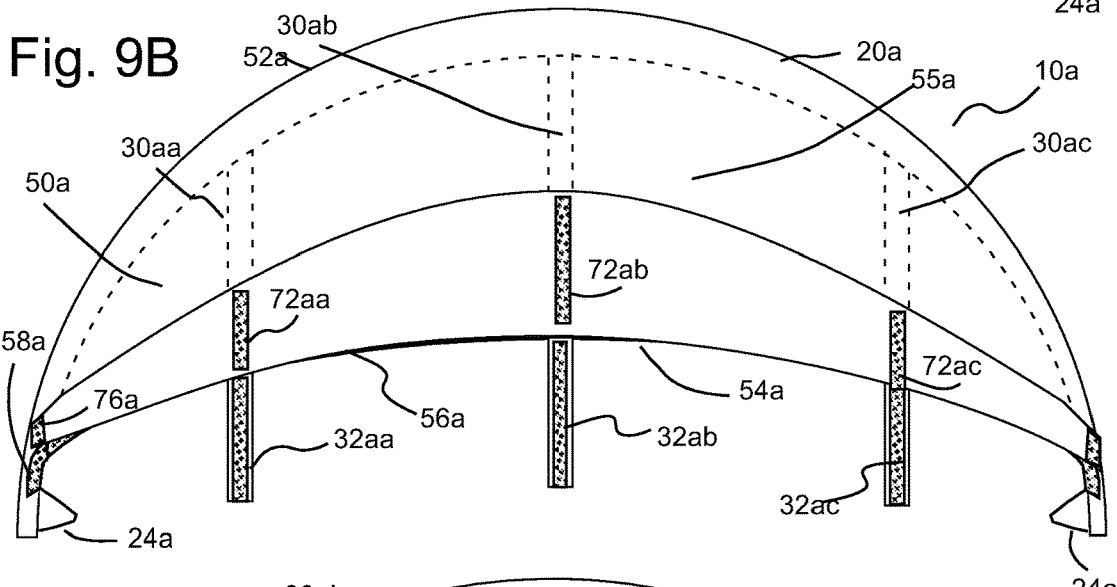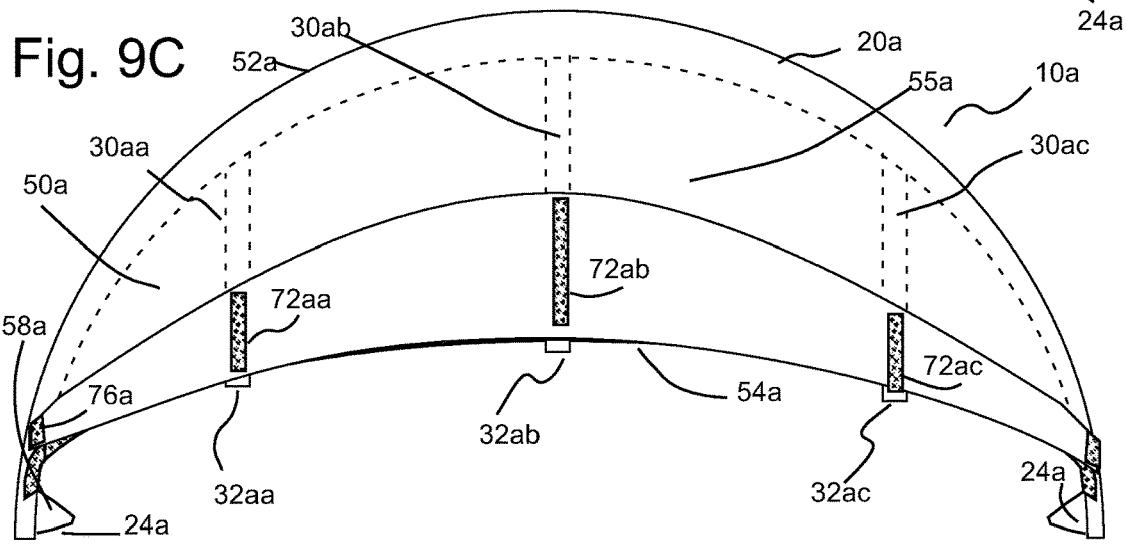

ADJUSTABLE AREA KITE OR WING

CROSS-REFERENCE TO RELATED APPLICATIONS

This application claims benefit of U.S. Provisional Patent Application Ser. No. 62/262,234, filed Dec. 2, 2015 and U.S. Provisional Patent Application Ser. No. 62/235,948, filed Oct. 1, 2015, the disclosures of which are incorporated herein by reference.

BACKGROUND

The following information is provided to assist the reader in understanding technologies disclosed below and the environment in which such technologies may typically be used. The terms used herein are not intended to be limited to any particular narrow interpretation unless clearly stated otherwise in this document. References set forth herein may facilitate understanding of the technologies or the background thereof. The disclosure of all references cited herein are incorporated by reference.

Kiteboarding is a water sport in which the power of wind is harnessed with a controllable power kite to propel an individual across the land or water on a kiteboard which is similar to a wakeboard or a small surfboard. Kitesurfing is a style of kiteboarding where the board is designed to be used on a wave. Often the board has a distinct nose and tail that performs best traveling the direction from the nose towards the tail. The board may or may not have foot-straps.

Modern power kites (or simply kites) are designed to operate over a range of wind speeds. However, wind speed may vary over a span of time, requiring the use of kites having different surface areas. In general, kites of larger area are adapted for use with lower wind speeds and may become unsafe to operate at higher wind speeds. Typically, three or four kites of different areas are taken by a kitesurfer to an outing. When a kitesurfer needs to change out the kite because of a wind change, the kitesurfer must return to shore either on a dangerously overpowered kite or on an underpowered kite. Once on shore, the kitesurfer must land the kite, which is one of the riskiest procedures in the sport. Once the kite is landed, the kitesurfer must lay out their lines and equipment on the beach which requires space and wears out the equipment faster. Moreover, the requirement of maintaining multiple kites to kitesurf in various wind speeds makes kitesurfing a very expensive sport as each kite typically costs USD 1,500 or more.

SUMMARY

In one aspect, a kite includes a frame including a leading edge support and a plurality of struts extending rearward from the leading edge support, a flexible main canopy attached to the frame, and at least one kite sizing section adjustably (for example, foldably or removably) attachable to the flexible main canopy. The at least one flexible kite sizing section may, for example, be adjustably attached or attachable to the flexible main canopy to change an area of the kite, including an area of at least a first wing tip section of the kite.

In a number of embodiments, the leading edge support is generally concave in shape and includes a first wing tip section at a first end thereof and a second wing tip section at a second end thereof. In a number of embodiments, the first wing tip section and the second wing tip section are dimensioned to affect control of the kite upon removal of the at least one kite sizing section.

The at least one kite sizing section may, for example, be removably attachable to a trailing edge of the main canopy via at least one releasable fastening mechanism. The at least one kite sizing section may, for example, be further removably attachable to the first wing tip section and to the second wing tip section via at least one releasable fastening mechanism. In a number of embodiments, the at least one releasable fastening mechanism comprises at least one section of hook-and-loop type fastener.

At least one of the plurality of struts may, for example, be adjustable in length. The leading edge support may, for example, be adjustable in at least one of length or conformation. In a number of embodiments, the leading edge support and the plurality of struts are inflatable.

In a number of embodiments, the at least one of the main canopy or the at least one kite sizing section includes at least one port therein which can be opened or closed by a user of the kite. The at least one port may, for example, be opened to varying sizes.

In another aspect, a method of altering the flight characteristics of a flexible wing includes providing a flexible main canopy of the wing and providing at least one kite sizing section removably attachable to the main canopy.

In another aspect, a kite includes a frame including a leading edge support and a plurality of struts extending rearward from the leading edge support, a canopy attached to the frame, and at least one closable port in the canopy.

In another aspect, a method of altering the flight characteristics of a flexible wing includes providing a flexible canopy of the wing and controlling the state of an openable port in the canopy.

In another aspect, a kite includes a frame including a leading edge support and a plurality of struts extending rearward from the leading edge support, a flexible main canopy attached to the frame and at least one flexible kite sizing section adjustably attached to the flexible main canopy. The at least one flexible kite sizing section is adjustable to change an area of the kite, including an area of at least a first wing tip section of the kite. As described above, the at least one flexible kite sizing section may be foldably or removably attached to the flexible main canopy. In a number of embodiments, the at least one flexible kite sizing section is removably attached to the flexible main canopy.

In a number of embodiments, a first flexible kite sizing section is removably attachable to the main canopy at the first wing tip section of the kite and a second flexible kite sizing section removably attachable to a second wing tip section of the kite.

The leading edge support may, for example, be generally arced (for example, concave) in shape over at least a portion thereof.

In a number of embodiments, the at least one flexible kite sizing section is removably attachable to a trailing edge of the main canopy via at least one releasable fastening mechanism. The at least one flexible kite sizing section extends from the first wing tip section to a second wing tip section of the kite. In a number of embodiments, the at least one releasable fastener includes at least one section of hook-and-loop type fastener extending along at least a portion of the trailing edge of the main canopy and the at least one flexible kite sizing section includes a cooperating hook-and-loop type fastener extending along at least a portion of a forward edge thereof.

In a number of embodiments, at least one of the plurality of struts is adjustable in length. The leading edge support may also be adjustable in at least one of length or conformation.

The leading edge support and the plurality of struts may, for example, be inflatable. In a number of embodiments, at least one of the plurality of inflatable struts is adjustable in length and the kite comprises at least one retainer to maintain the at least one of the plurality of struts in an adjusted length.

In a number of embodiments, the kite includes a first wing tip member extending from a first end of the leading edge support and a second wing tip member extending from a second end the leading edge support. The first wing tip member and the second wing tip member are dimensioned (that is, sized and shaped) to affect a desired amount of control of the kite upon removal of the at least one kite sizing section.

At least one of the main canopy or the at least one kite sizing section may, for example, include at least one port therein which can be opened or closed by a user of the kite. In a number of embodiment, the at least one port can be opened to varying sizes or degrees.

In another aspect, a method of altering the flight characteristics of a flexible wing includes providing a flexible main canopy of the wing and providing at least one flexible kite sizing section adjustably attached to the main canopy, wherein the at least one flexible kite sizing section is adjustable to change an area of the kite, including an area of at least a first wing tip section of the kite.

In a further aspect, a kite includes a frame including a leading edge support and a plurality of struts extending rearward from the leading edge support, a flexible canopy attached to the frame, and at least one closable port in the canopy, the at least one closeable port providing for a plurality of open port areas.

In still a further aspect, a method of altering the flight characteristics of a flexible wing includes providing a flexible canopy of the wing including an openable port in the flexible canopy, and controlling the state of an openable port in the flexible canopy to one of a plurality of open states of differing port areas.

The present devices, systems, and methods, along with the attributes and attendant advantages thereof, will best be appreciated and understood in view of the following detailed description taken in conjunction with the accompanying drawings.

BRIEF DESCRIPTION OF THE DRAWINGS

FIG. 8E illustrates a schematic view of the kite of FIG. 8A under wind power.

FIG. 9A illustrates a top schematic view of another embodiment of a kite hereof with a foldable kite sizing section in a maximum area state.

FIG. 9B illustrates a top schematic view of the kite of FIG. 9A with the kite sizing section folded over the main kite canopy to a minimum area state.

FIG. 9C illustrates a top schematic view of the kite of FIG. 9A with the kite sizing section folded over the main kite canopy to the minimum area state and the struts adjusted to the modified kite area.

DETAILED DESCRIPTION

Figure 1:
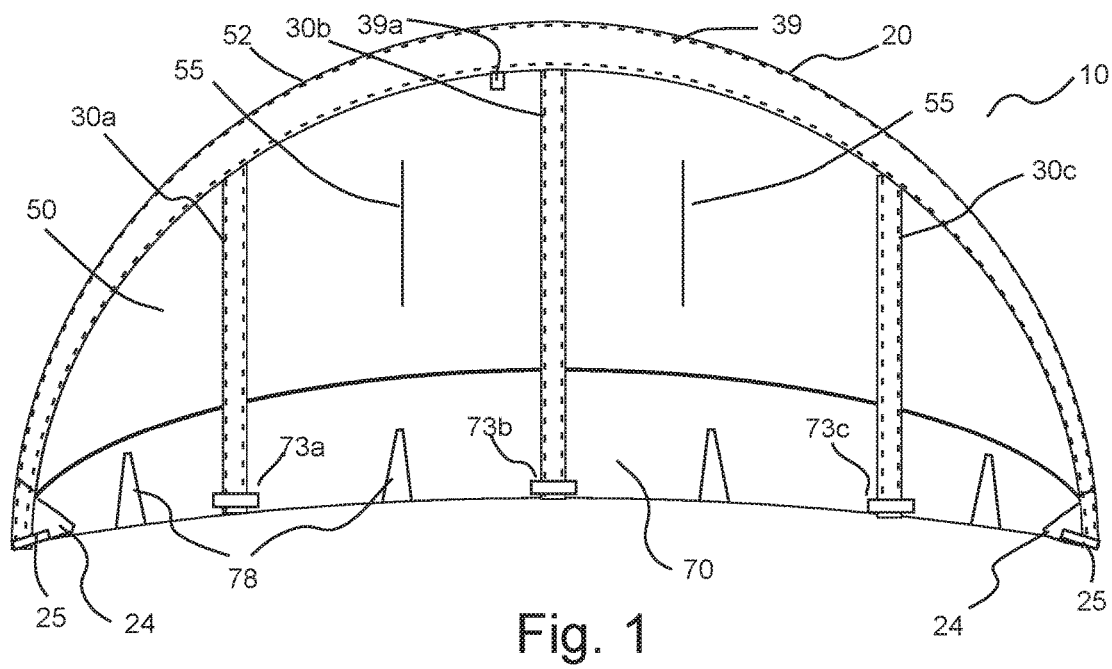
FIG. 1 illustrates a bottom schematic view of an embodiment of a kite or wing hereof with a kite sizing section in operative connection with a main kite canopy.
Figure 2:
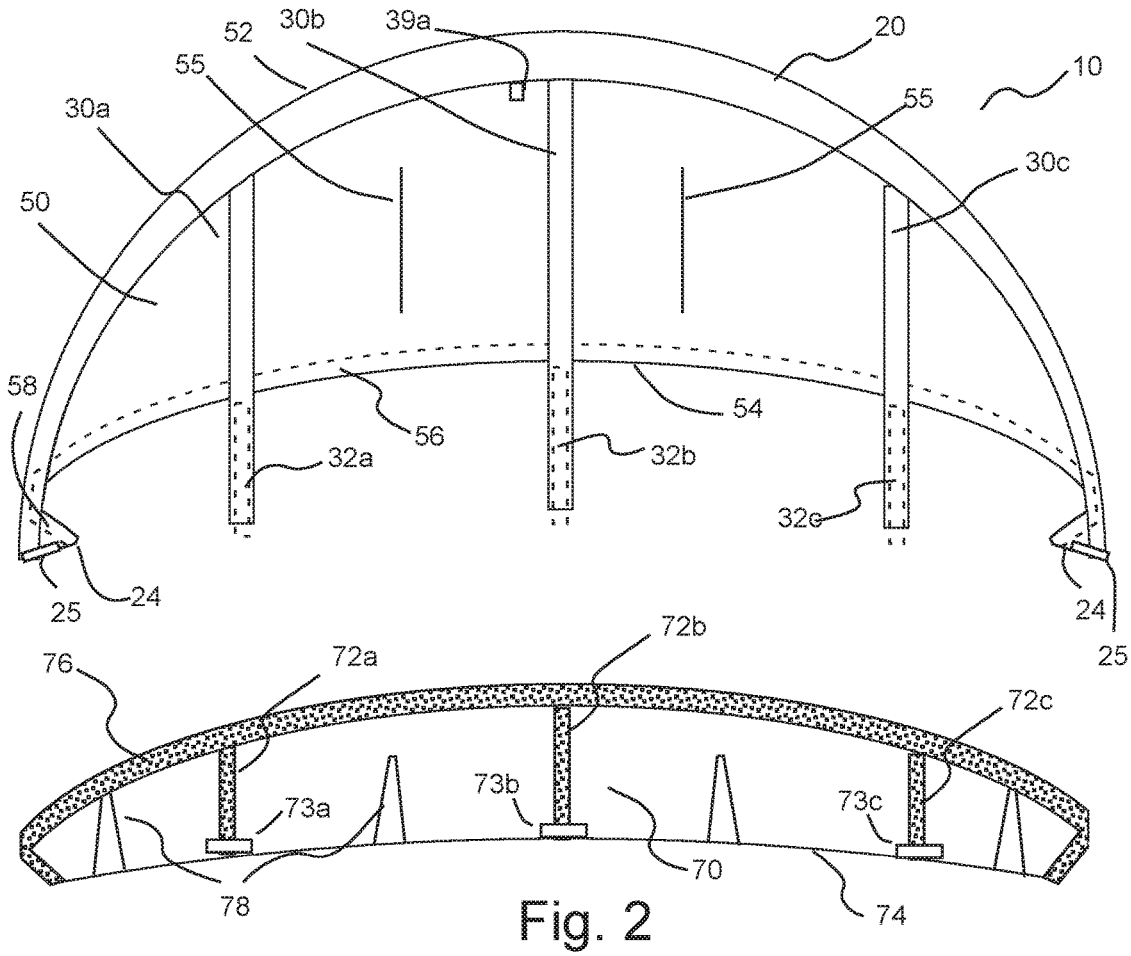
FIG. 2 illustrates a bottom schematic view of the kite of FIG. 1 with the kite sizing section removed from operative connection with a main kite canopy.
Figure 3:
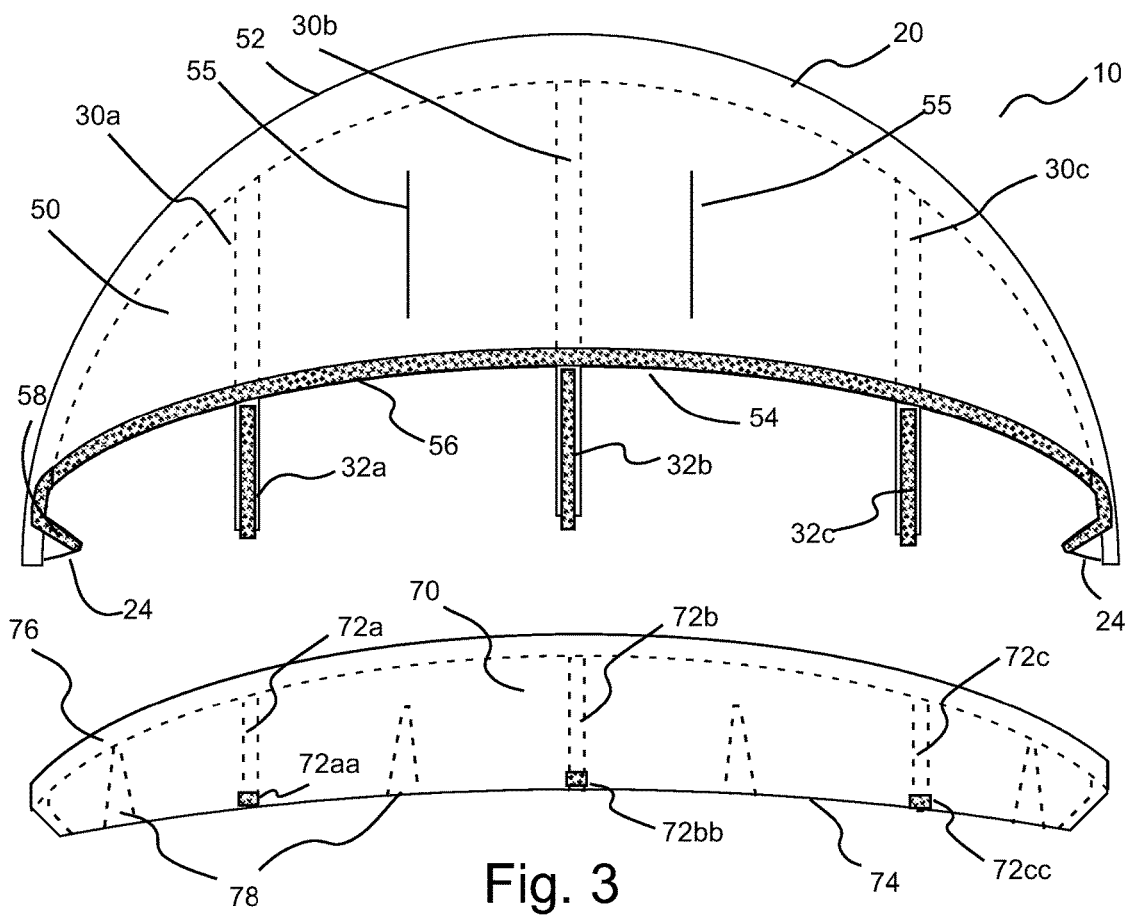
FIG. 3 illustrates a top schematic view of the kite of FIG. 1 with the kite sizing section removed from operative connection with a main kite canopy.
Figure 4:
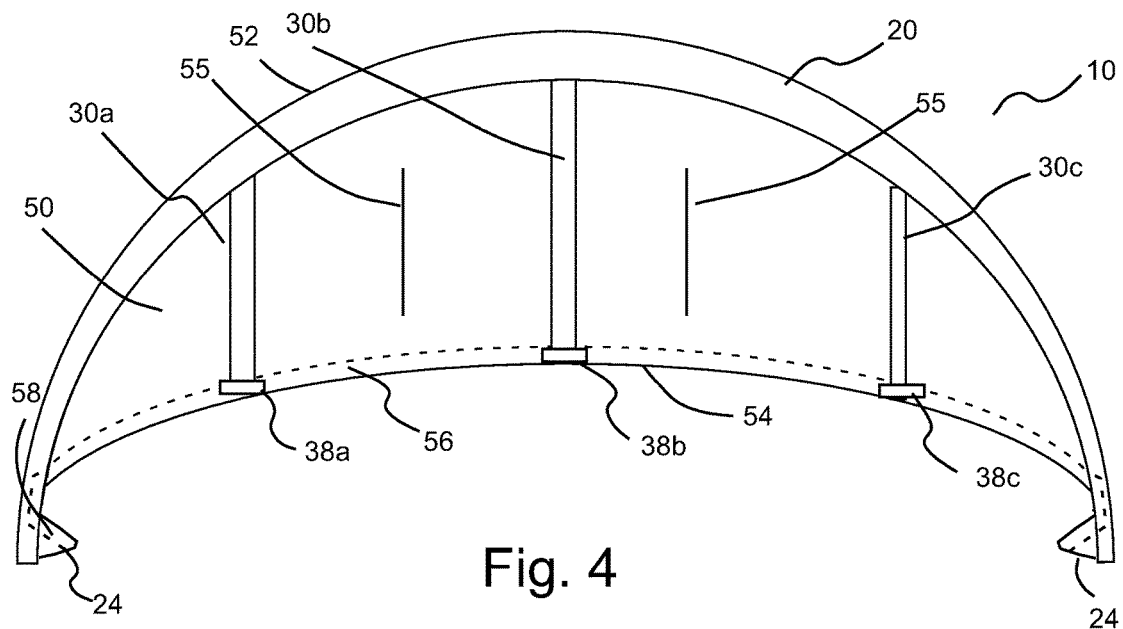
FIG. 4 illustrates a bottom schematic view of the kite of FIG. 1 with the kite sizing section removed from operative connection with a main kite canopy and struts of the kites resized.
Figure 5:
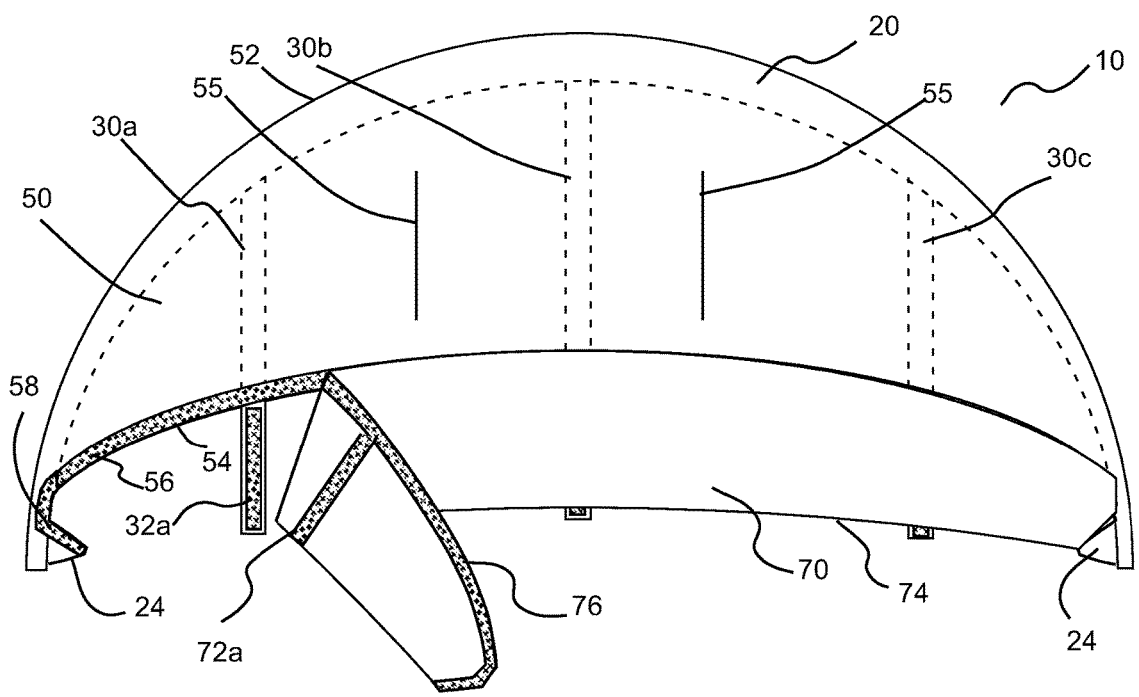
FIG. 5 illustrates a top schematic view of the kite of FIG. 1 with the kite sizing section partially removed from connection with the main kite canopy.
Figure 6:
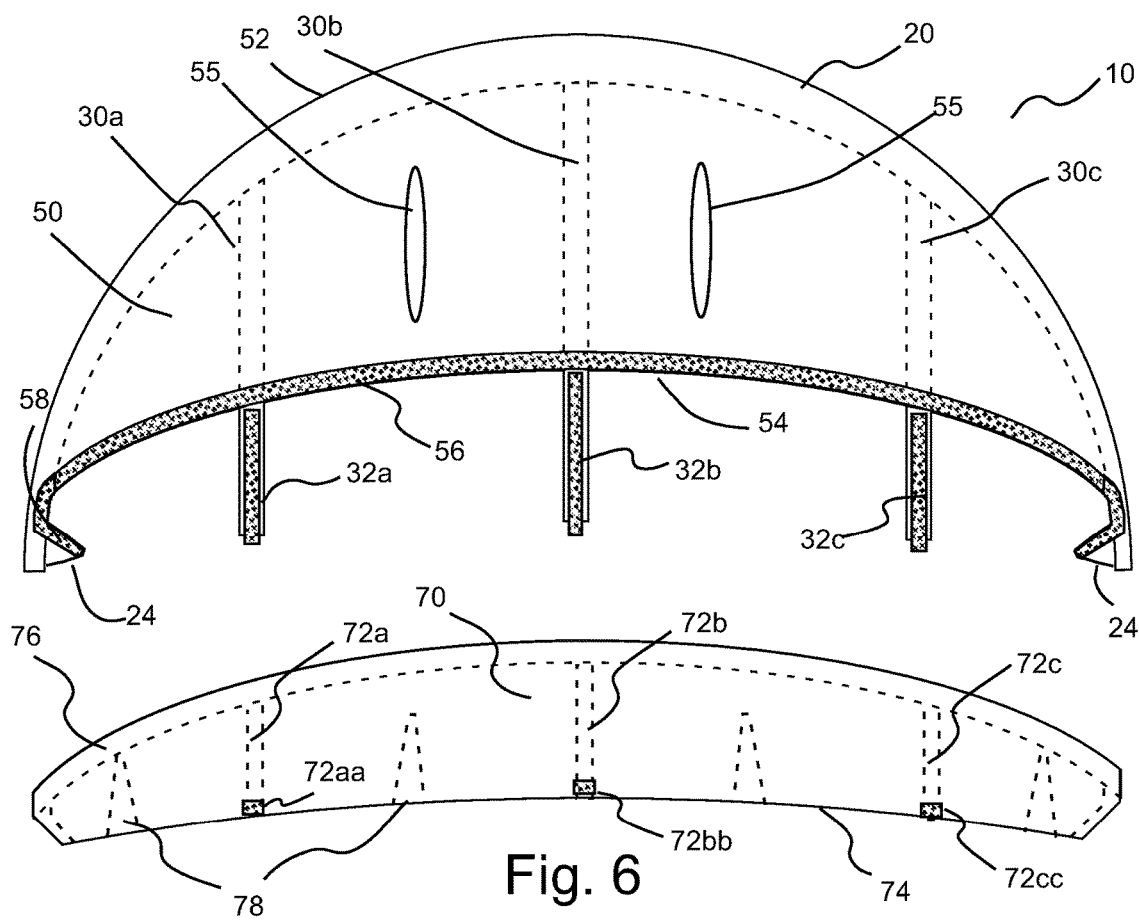
FIG. 6 illustrates a top schematic view of the kite of FIG. 1 with the kite sizing section removed from connection with the main kite canopy and air vents in the main kite canopy in an open state.

It will be readily understood that the components of the embodiments, as generally described and illustrated in the figures herein, may be arranged and designed in a wide variety of different configurations in addition to the described representative embodiments. Thus, the following more detailed description of the representative embodiments, as illustrated in the figures, is not intended to limit the scope of the embodiments, as claimed, but is merely illustrative of representative embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

As used herein and in the appended claims, the singular forms "a," "an", and "the" include plural references unless the context clearly dictates otherwise. Thus, for example, reference to "kite sizing section" includes a plurality of such kite sizing sections and equivalents thereof known to those skilled in the art, and so forth, and reference to "the kite sizing section" is a reference to one or more such kite sizing sections and equivalents thereof known to those skilled in the art, and so forth. Recitation of ranges of values herein are merely intended to serve as a shorthand method of referring individually to each separate value falling within the range. Unless otherwise indicated herein, and each separate value, as well as intermediate ranges, are incorporated into the specification as if individually recited herein. All methods described herein can be performed in any suitable order unless otherwise indicated herein or otherwise clearly contraindicated by the text.

In a number of embodiments hereof, kites are adjustable in size to, for example, make all kite sports (for example, kitesurfing, kiteboarding etc.) easier to rig the correct size kite, less expensive than buying multiple kites, more compact for travel and safer for the participants. The participants in kite sports, and kitesurfing in particular, often need to carry and prepare for use a number different sized kites. As described above, kites are sized differently to provide acceptable performance in various ranges of wind speed. The wind speed range over which a particular kite is optimally operable for a particular kitesurfer may, for example, be as narrow 10 knots. Often, a kitesurfer will pick a kite size they believe to be optimal for the current wind speed use on the water. The kitesurfer may also prepare a kite "one size up" in wind speed range from the current kite and a kite "one size below" in wind speed range from the current kite and leave those alternative kites on the beach for use in case the wind changes. Having two extra kites pre-prepared allows the kitesurfer to spend more time on the water because, to change kites absent such pre-preparation, the kitesurfer needs to return shore, land his or her current kite, and re-rig a new kite. This is often a long process, taking around 30 minutes (depending upon the distance of the kitesurfer from that area of the shores at which their equipment kit is located).

A readily apparent difference between kites of different sizes is the surface area of the canopy. In general, larger surface areas are capable of catching more of the wind, and are thus able to work better at lower wind speeds than kites of smaller surface area. A problem arises, however, when wind speeds change. In that regard, a kite chosen for relatively low wind speeds may be dangerously overpowered if wind speed increases, forcing a kitesurfer to ride an overpowered kite back to shore to hook up a smaller kite. Moreover, problems arise when wind speed decreases and the kitesurfer has a significantly underpowered kit. In a number of embodiments of devices, systems and methods hereof, the size or total surface area of kite canopy is altered without the use of complex methods/mechanisms (for example, rods, pulleys, motors, and solid movable panels, all of which add considerable weight and complexity to the delicately balanced kites). In that regard, kites hereof include one or more movable or removable kite sizing panels or sections that can be adjusted to increase or to or decrease kite surface area. In a number of embodiments, one or more kite sizing panels or sections are movably or removably attached to the trailing edge of the kite's main canopy. In a number of embodiments, adjustment of kite surface area via adjustment of kite sizing panels or sections hereof requires no tools and may even be adjusted while the kitesurfer is still on the water.

Figure 8A:
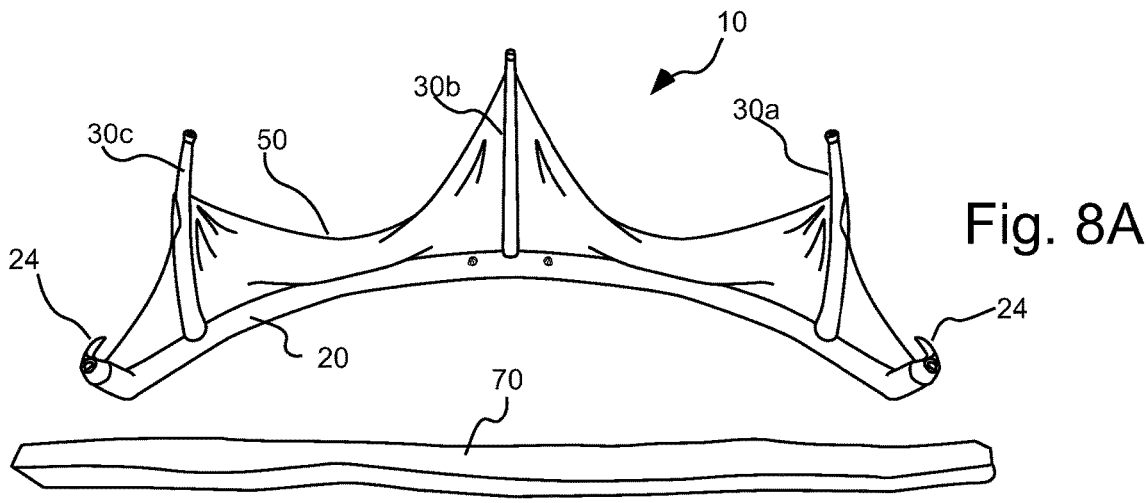
FIG. 8A illustrates a perspective view of an embodiment of a kite hereof on the ground with a kite sizing section removed from connection with the main kite canopy and resting on the ground in front of the kite.
Figure 8B:
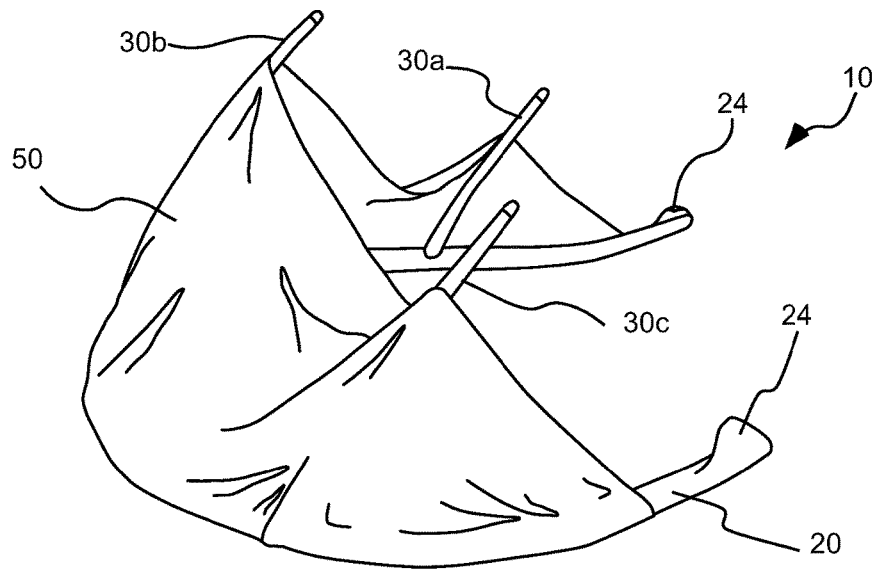
FIG. 8B illustrates another perspective view of the kite of FIG. 8A on the ground with the kite sizing section removed from connection with the main kite canopy and resting on the ground in front of the kite.

Although one or more kite sizing sections may be adjustably, movably or removably attachable to a kite, there are a number of considerations that should be taken into account in designing a kite with movably attached kite sizing panels. For example, adjusting one or more panels only in the vicinity of the center of the kite to reduce kite area may diminish power somewhat, but during a turn, the power of the kite will not be decreased significantly because the area of the wing tips (see, the encircled area in FIG. 8E) of the kite has not been decreased. In certain wind conditions, the kite user may not be able to control the power created by the kite during a turn. In a number of embodiments of kites hereof, one or more adjustable panels of thus provide for adjustment of the area of the kite at one or more of the wing tips of the kite. Adjusting or removing surface area of a kite in the vicinity of the wing tips may also be beneficial because it is typically in this area where the most turbulence occurs.

In a number of embodiments, a single adjustable kite sizing panel may be provided to, for example, limit turbulence created as compared to taking out multiple kite panels. Further, panel edges may be smooth, arced, curved or curvilinear to limit, reduce or minimize turbulence. Moreover, adjusting a single kite sizing panel may be simpler and easier to perform both on the water and on land, and particularly in windy conditions. Further, providing a single, relatively large adjustable/removable kite sizing panel provides a scaffold for customizable space for sponsors and kiters to modify the appearance of a kite.

Adjusting one or more kite sizing sections such that the form of the new trailing edge of the adjusted kite is similar in contour to the original trailing edge assists in maintain similarity in powering and de-powering of the kite, although the kite area or size is changed. Taking out sections that closely parallel the trailing edge will help keep the similar power delivery during a turn between the different kite sizes. The contours of the original and adjusted/new trailing edges may, for example, be approximately parallel (that is, approximately parallel lines and/or parallel curves). The concept of parallel or offset curves generalizes the concept of parallel lines. A parallel or offset curve may be defined as a curve whose points are at a fixed normal distance from a given curve. In a number of embodiments, the normal distance between points on contours of original and adjusted/new trailing edges hereof may, for example, vary by less than 20% or less than 10% from an average distance. Providing an adjustable kite sizing panel that generally parallels the original trailing edge when adjusted allows for multiple sizing options using, for example, removable kite sizing panel of the same or similar contour/shape but differing width/area.

Moreover, placing reinforcement along at least a portion of the trailing edge of the kit may be beneficial to strengthen an area of the kite that typically wears the fastest. In embodiments of kites hereof in which one or more kite sizing panels are adjustable/removable along a trailing edges, an interface such as a fastener along at least a portion of the length of the trailing edge may assist in reinforcing and strengthening the area of the trailing edge. In a number of embodiments hereof, a single flexible kite sizing panel or section that is removably attachable at a trailing edge of the flexible main canopy, and which extend from the first wing tip to the second wing tip of the kit, is provided. As described above, the entire trailing edge of a kite wears fastest. Providing a kite sizing section removably attachable to the trailing edge of the main canopy, and which extends along the entire length of the main canopy (that is, from the first wing tip to the second wing tip of the kite), provides an inexpensive and relatively simple manner of replacing the entire trailing of the kite (by simply, providing a new kite sizing section/panel).

In a number of embodiments hereof, struts of the frame of the kites hereof are adjustable in length to, for example, conform to an adjusted leading edge. In the case of inflatable struts, the ability to change the lengths of the struts allows the surfer to change the pressure in the struts. For example, rolling up a strut to shorten its length increases the pressure in the strut and in the trailing edge. The ability to change strut pressure is particularly advantageous in smaller kites with an adjustable kite sizing panel. By adjusting the length of the struts to a length suitable to support an adjustable trailing edge, the overall kite has a smoother trailing edge and reduced turbulence as compared to kites in which struts extend significantly beyond a trailing edge. Struts extending beyond a trailing edge or other projections in the vicinity of the trailing edge may trap kite lines (for example, if the kite lands in the water). Trapping of kite lines may lead to dangerous situations that may result in injury. Also, such trapping of kite lines will very likely result in damage (for example, tearing or ripping) of the kite canopy. A smoothly extending trailing edge with struts that do not extend significantly beyond the trailing edge assists in preventing trapping of kite lines by allowing a kite line behind the trailing edge of the kite to slide off the end of the wing tip.

Figure 7A:
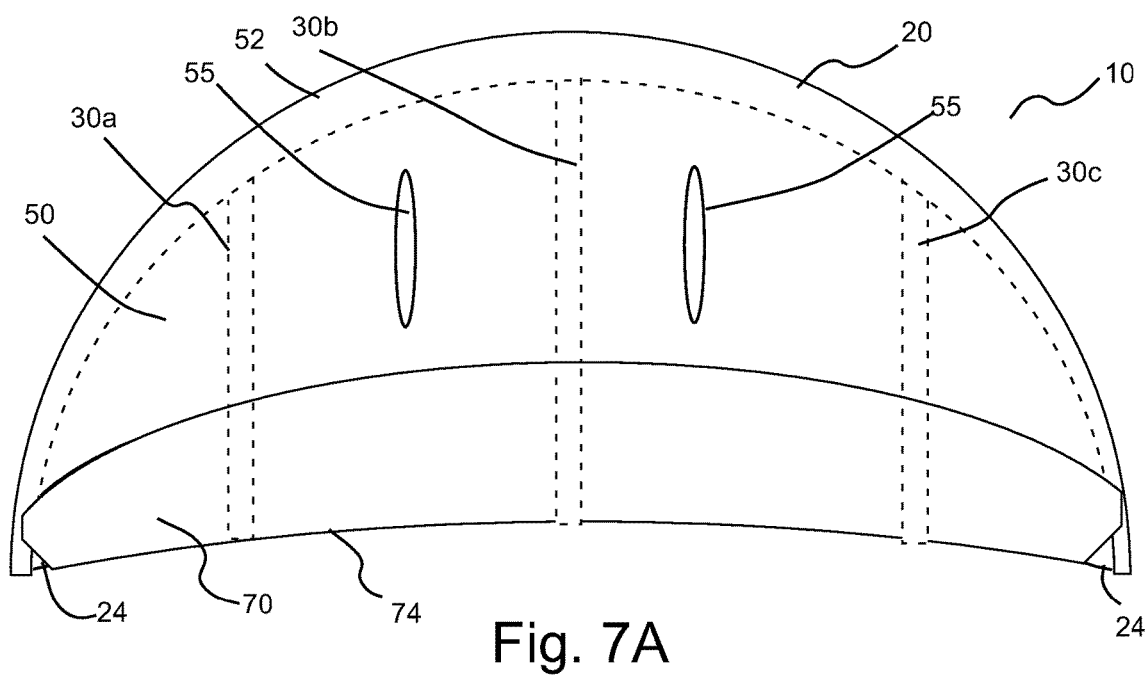
FIG. 7A illustrates a top schematic view of the kite of FIG. 1 with the kite sizing section in operative connection with the main kite canopy and air vents in the main kite canopy in a fully open state.
Figure 7B:
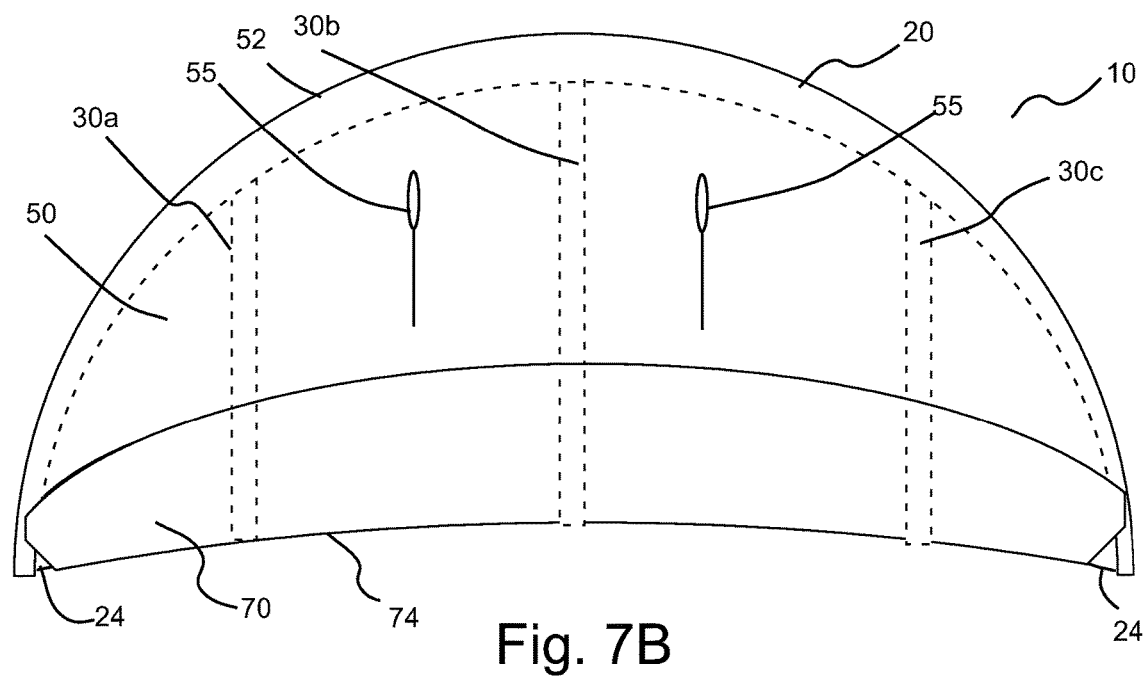
FIG. 7B illustrates a top schematic view of the kite of FIG. 1 with the kite sizing section in operative connection with the main kite canopy and air vents in the main kite canopy in a partially open state.
Figure 8C:
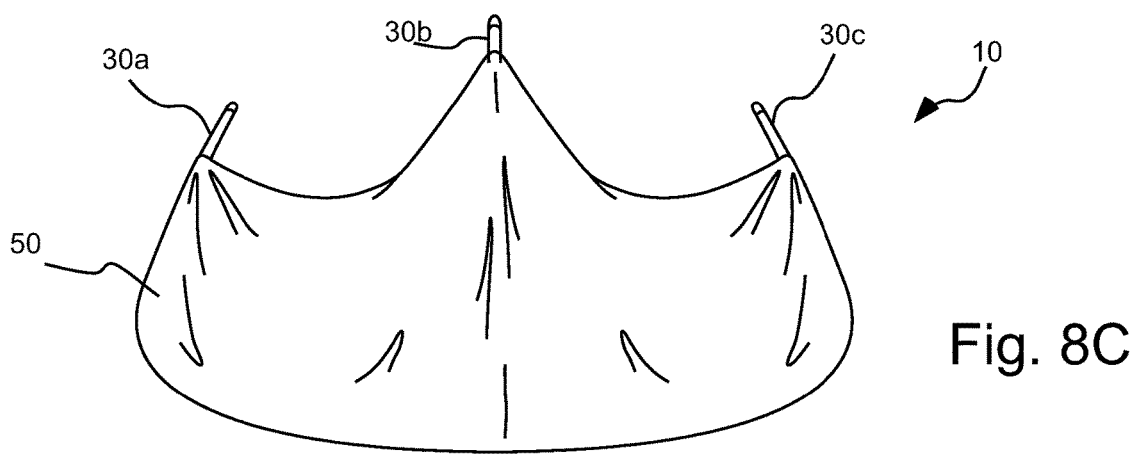
FIG. 8C illustrates another perspective view of the kite of FIG. 8A on the ground with the kite sizing section removed from connection with the main kite canopy and resting on the ground in front of the kite.
Figure 8D:
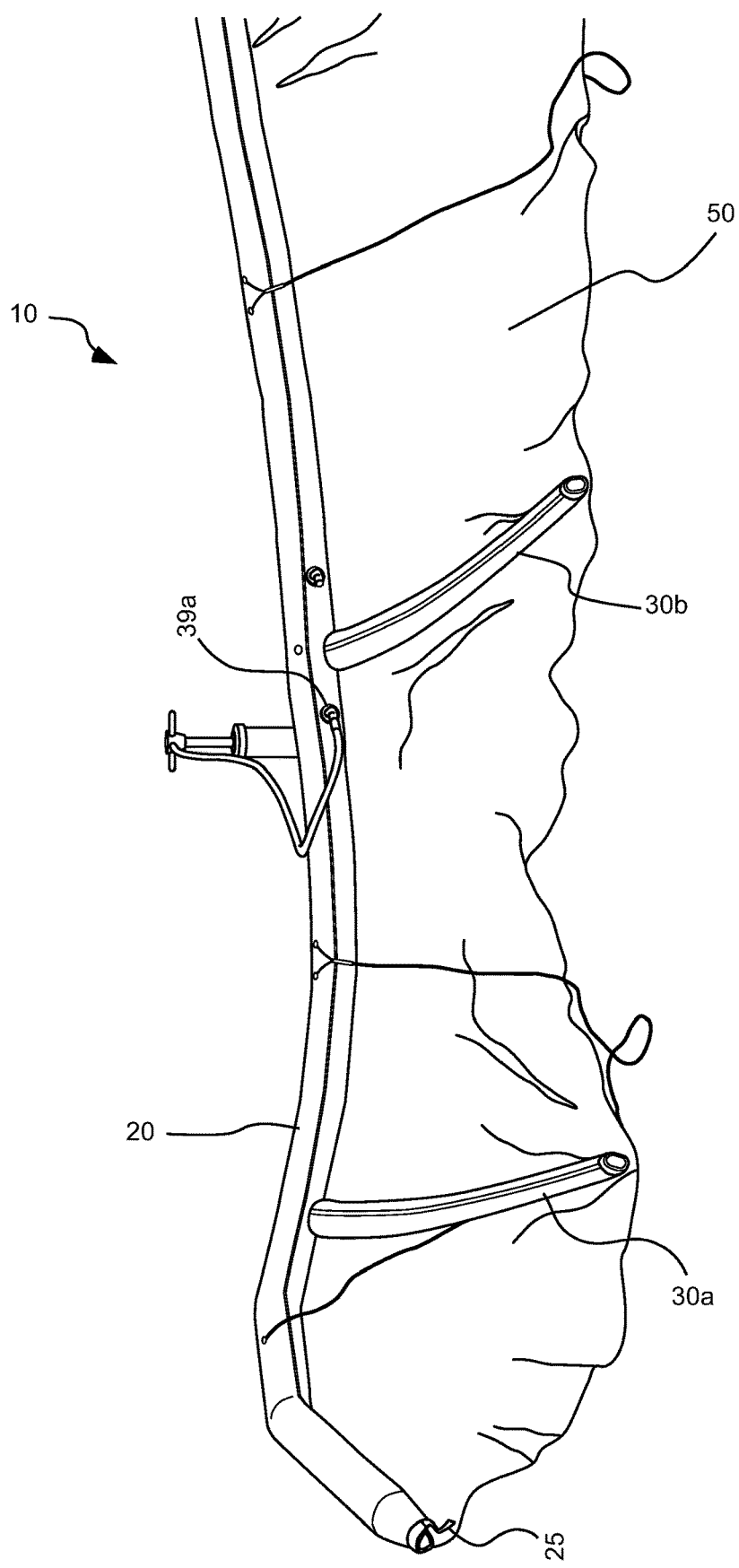
FIG. 8D illustrates a perspective view of the kite of FIG. 8A showing a pump connected to a valve to inflate the frame of the kite.

A representative embodiment of a kite 10 hereof is illustrated in FIGS. 1 through 8C. Kite 10 includes a frame that uses air pressure to provide structure. Often the frame is inflatable as the illustrated kite. The frame includes a leading edge or leading edge support 20 and struts 30a, 30b and 30c extending rearward from leading edge support 20. Although three struts are illustrated, kites hereof may have fewer than or greater than three struts. Leading edge support 20 and struts 30a, 30b, and 30c may be in fluid connection and inflatable via a single valve. Alternatively, leading edge support 20 and struts 30a, 30b, and 30c may not be in fluid connection and inflatable via a separate valve. FIG. 8A through 8C illustrates the generally concave, three-dimensional shape of the frame system of kite 10 upon inflation of the frame system. Leading edge support 20 and struts 30a, 30b, and 30c may for example, be generally cylindrical in shape upon inflation. Inside of leading edge support 20 and each strut 30a, 30b and 30c is one or more inflatable bladders 39 as represented in dashed lines in FIG. 1. Inflatable bladder(s) 39 may, for example, be made from an elastic, air tight material that is suitable to hold air under the conditions of use of kite 10. Inflatable bladder(s) may be inflated via one or more valves 39a (see, for example, FIGS. 1, 2 and 8D) which may be connected to a hand pump or other mechanical pump. Leading edge support 20 and struts 30a, 30b and 30c may further include tubes of material that surround and hold bladders 39 in place and attach to main kite canopy 50 as described below. Although representative embodiments of kites hereof include an inflatable frame (which is provided for ready flotation on water, and wherein the inflated edge also provides strength and elasticity needed inflight and during collisions), other types of frames may be used in the kites hereof.

Kite 10 further includes a main canopy, main canopy panel or main canopy section 50 which may, for example, be non-removably attached to the frame system, for example, via stitching. In that regard, main canopy 50 may include a sleeve 52 (created, for example, via stitching) which encompasses leading edge support 20. Main canopy 50 may also be sewn to the top surface of each of struts 30a, 30b and 30c.

Kite 10 further includes one or more removable panels or sections 70 of canopy material sometime referred to herein as kite sizing panels or sections. Removable kite sizing sections 70 may, for example, be shaped in a manner so that kite sizing sections 70 do not significantly reduce the performance of kite 10 when removed to reduce overall canopy size (for example, to adjust kite 10 for use with higher wind speeds). In the illustrated embodiment, kite sizing section 70 is illustrated as an integral section of canopy material. However, kite sizing sections hereof may be formed in multiple sections or portions which may be attached to each other and/or to the remainder of kite 10 to, for example, adjust length and/or other dimensions of the kite sizing sections. Moreover, multiple kite sizing sections of different characteristics can be provided to readily adjust the flight characteristics of the kites hereof.

The outer material or sleeve material of the frame of kite 10 including leading edge support 20 and struts 30a, 30b, and 30c may, for example, be fabricated from a flexible and resilient material such as a polyester (for example, TECHNOFORCE® D2, available from Teijin Frontier Co., LTD of Osaka, Japan or DACRON® available from E. I. DuPont De Nemours and Company Corporation of Wilmington, Del. US) or a ripstop nylon. In the case of an inflatable frame, one or more inflatable bladders may be provided within the frame as described above. Main canopy 50 and the one or more kite sizing sections 70 hereof may be fabricated from a flexible resilient material such as a polyester or a ripstop nylon.

Removable kite sizing section 70 may be removably attachable to kite 10 via any removable fastening mechanism(s) or system(s) known in the art which is/are suitable to maintain kite sizing section 70 in operative connection with the remainder of kite 10 during conditions of use. Suitable fastening mechanism include hook-and-loop type fasteners (such as VELCRO® fasteners or connectors, available from Velcro USA Inc. of Manchester, N.H.), zippers, buttons, snaps, strings, magnetic fasteners, and other fastening or closure mechanisms known in the fastening arts. In the illustrated embodiment (in which removable kite sizing section 70 is attached to trailing edge 54 of main canopy 50), one or more sections 56 of hook-and-loop type fastener extends along a trailing edge 54 of main canopy 50. One or more sections 58 of hook-and-loop type fastener also extends (on an upper surface of main canopy 50) along a trailing or rearward portion of leading edge support 20 and along wing tip sections or members 24, which extend inward from leading edge support 20 at or near a rearward or trailing end (or tip) thereof.

The forward edge of kite sizing section 70 is shaped to generally the same contour and the trailing edge of main canopy 50 until it reaches its outer edges. At the outer edges of kite sizing section 70, the forward edge of kite sizing section 70 overlays a portion of leading edge support 10 at its rearward ends and a forward portion of wing tip members 24. One or more sections of hook-and-loop types fastener 76 extend (on a lower side of kite sizing section 70) along a forward edge of kite sizing section 70. Fastener 76 cooperates with fasteners 56 and 58 to removably connect kite sizing section 70 to the remainder of kite 70. In the illustrated embodiment, kite sizing section 70 also includes sections 72a, 72b and 72c of hook-and-loop type fastener on the lower surface thereof, which cooperate with sections 32a, 32b and 32c of hook-and-loop type fastener on an upper surface of struts 30a, 30b and 30c respectively to assist in removably securing kite sizing section 70 to the remainder of kite 10. In a number of embodiments, hook-and-loop type fastener sections 32a, 32b and 32c may extend beyond the end of struts 30a, 30b and 30c and may be extend around the trailing edge to cooperate with hook-and-loop type fastener sections 72aa, 72bb and 72cc (see FIG. 3) on an upper surface of kit sizing section 70. Additional, straps 73a, 73b, and 73c may be provided upon an underside of kite sizing section 70 to extend around and further secure struts 30a, 30b and 30c. In the illustrated embodiments, straps 73a, 73b and 73c extend from the canopy of removable kite sizing section 70 under struts 30a, 30b and 30c and back to the canopy of removable kite sizing section 70, adding a safety measure that, for example, prevents control lines 92 (see FIG. 8E) from becoming ensnared when kite 10 is full sized. In kites and other wings with non-inflatable struts, the struts can be adjustable in length via telescoping, folding over and connecting back onto itself, removable sections (including threaded and/or other types of connector mechanisms), etc. Section(s) 78 of material having stiffer characteristics than the canopy material of kit sizing section 70 may, for example, be provide to provide stiffness to trailing edge 74 of kite sizing section 70. Similarly, a stiffening material (not shown, and having stiffer characteristics than the canopy material of the remainder of main canopy 50) may also be provided on or near trailing edge 54 of main canopy 50 to provide stiffer characteristics than the remainder of canopy 50. As illustrated schematically in FIG. 8E, control lines 92 are operatively connectible to a control bar 200 which is gripped and controlled by a person on kiteboard 300 as known in the kitesurfing/kiteboarding arts.

The area of kite 10 commonly referred to as the wing tip is encompassed by a dashed area in FIG. 8E. The wing tips of a kite are very important to the control of the kite. Upon removal of kite sizing panel 70 from the remainder of kit 10, wing tip members 24 provided a control surface. In the illustrated embodiment, wing tip members 24 are illustrated schematically as relative small triangular sections of material. Wing tip members 24 may, however, be readily designed using engineering principles to adjust and/or optimize kite control upon removal of kite sizing section 70 from operative connection with kite 10.

In a number of embodiments, struts 30a, 30b, and 30c are adjustable in length to the new size of kite 10 upon removal of kite sizing panel 70. When kite sizing section 70 is removed in the illustrated embodiment, the portions of struts 30a, 30b and 30c extending rearward beyond main canopy 50 struts are rolled up and held in place by connectors such as a loops of material 38a, 38b and 38c (see FIG. 4) that keep those portions of struts 30a, 30b and 30c rolled up under main canopy 50, which helps prevent the control lines (see FIG. 8E) from becoming ensnared around the extending strut portions when, for example, kite 10 crashes. When kite sizing section 70 is attached to kite 10, the rearward portion of struts 30a, 30b and 30c is unraveled so that kite sizing section 70 can be attached to trailing edge 54 of main canopy 50 and to struts 30a, 30b and 30c as described above.

The placement of removable kite sizing section 70 at the trailing edge of kite 10 is advantageous because that placement does not significantly affect the performance/control of kite 10 (that is, the ability to maintain the desired control of kite 10 in, for example, changing wind conditions). By the time air flow reaches the trailing edge of kite 10, the airflow is substantially spoiled. Changing the aspect ratio of the kite 10 by, removal of kite sizing section 70 from trailing edge 54 of main canopy 50 does not significantly reduce the lift produced by kite 10. Upon removal of kite sizing section 70, there is less drag on kite 10, so that kite 10 will tend to fly farther forward within the wind window. The wind window is a three-dimensional area wherein a kite flies down-wind of the kite flyer. If a kite flyer is standing with the kite flyer's back to the wind and defines a plane by stretching the kite flyer's arms out to either side raising them over the kite flyer's head, a perfect kite in perfect conditions would fly in that plane. Because of drag, wind resistance, friction, weight of the kite and different wind speeds, the kite will fly down wind of the kite flyer, anywhere from directly above the kite flyer to completely on the ground, and anywhere from directly to the right of the kite flyer to directly to the left of the kite flyer. In other words, the kite can fly anywhere on the edge of a three-dimensional quarter of a sphere, downwind of the plane above and on either side of the person holding the kite.

One may adjust for such flight tendencies by, for example, increasing the pressure in leading edge support 10 (by, for example, increasing the pressure within the bladder thereof) to provide a tauter trailing edge. The tauter trailing edge cleans up the air flow over main canopy 50, and will keep kite 10 flying far into the wind window. Rolling up struts 30a, 30b and 30c upon removal of kite sizing section 70 will increase the pressure in leading edge support 20 in kites in which leading edge support 20 and struts 30a, 30b and 30c are in fluid connection.

In a number of embodiments, kite sizing section 70 is shaped and/or dimensions so that, when removed, kite 10 has a smaller aspect ratio (length/width) that enables it to maintain its original wing span but handle like the smaller kite. The shape and positioning of kite sizing section 70 on kite 10, enables removal of that part of kite 10 (that is, along trailing edge 54 of main canopy 50) which is associated with lift generation, and not significantly associated with turning or flight performance. As described above, wing tip members 24 are left intact when kite sizing section 70 is removed. As described above, wing tip members 24 are important control surfaces of kite 10. Maintaining wing tips 34 intact, and not removing them with kite sizing section 70, maintains the performance of the kite and enables easier water launches when kite sizing section 70 is removed. Wing tip member 24 also assist in preventing control lines from getting entangled around the rearward end of leading edge support 20 (for example, upon crashing of kite 10). In a number of embodiments, a strip of material 25 or other member extends between the rearward end of leading edge support 20 and each of wing tip members 24 to assist in preventing control lines from getting between leading edge support 20 and the kite canopy. Straps 25 may, for example, bend the rearward or trailing end of leading edge support 20 over and onto itself. Thereby shortened, leading edge 20 is now streamlined. Also, there is no longer a protruding member that could snag a control line and result in loss of steering ability and loss of control of the kite.

In general, a kite has lift, or pull, because of the difference between air pressure above the kite canopy and air pressure below the kite canopy. Being able to alter the air pressure at specific points of the kite, enables one to change the lift and pull in designated areas of the kite to suit the needs of a kite user. A kite with a flat canopy will fly faster because there is less wind resistance, but it will not have much lift, and it will turn slowly. A kite with an arced canopy will be experience more wind resistance, and will fly slower. However, the kite with an arced canopy will turn faster and jump higher as a result of the increase wind resistance. One may be able to get at least some of the speed capability of a flat canopy kite as well as the turning and jumping capability of an arced canopy by, for example, injecting wind from the bottom of the canopy to the top.

In a number of embodiments, openable/closable openings or ports 55 may be provided in main canopy 50 and/or in kite sizing section(s) 70 as, for example, illustrated in FIGS. 1, 7A and 7B. Ports 55 may, for example, be openable to different extents (see FIGS. 7A and 7B) via one or more fastening or closing mechanisms such a zipper. One function of such ports 55 is to let air escape. If, for example, on creates openings or ports in a parachute, the user will drop faster, similar to the case that a smaller parachute was use. Opening ports 55 in kite 10 make kite 10 pull less, similar to using a smaller kite. Ports 55 may, for example, be infinitely adjustable using, for example, a zipper as a closing mechanism.

Another embodiment of a kite 10a hereof is illustrated in FIGS. 9A through 9C. Kite 10a is similar in design and operation to kite 10. However, kite 10a includes a kite sizing section 70a which provides for adjustable area of the kite canopy via moving/folding of kite sizing section 70a without removal of kite sizing section 70a from connection with main canopy or main canopy section 50a. In FIGS. 9A through 9C, components or elements of kite 10 are numbered similarly to corresponding components or element of kite 10 with the addition of the designation "a" thereto.

Similar to main canopy 50, main canopy 50a may, for example, be non-removably attached to the frame system, for example, via stitching. In that regard, main canopy 50a may include a sleeve 52a which encompasses leading edge support 20a. Main canopy 50a may also be sewn to the top surface of each of struts 30aa, 30ab and 30ac. Movable kite sizing section 70a is attached to main canopy 50a at an interface or seam 54a. Main canopy 50a and kite sizing section 70a may be formed monolithically or in one or more sections and attached. As illustrated in FIG. 9B, removable fasteners such as hook-and-loop type fasteners 72aa, 72ab, 72ac and 76a on the bottom surface of kite sizing section 70a can be removed from connection with cooperating fasteners such as hook-and-loop type fasteners 32aa, 32ab, 32ac and 58a so that kite sizing section 70a can be folded over main canopy 50a. Fasteners such as hook-and-loop type fasteners 75aa, 75ab, 75ac and 75ad (see FIG. 9A) on the top surface of kite sizing section 70a may be connected to cooperating fasteners such as hook-and-loop type fasteners 59aa, 59ab, 59ac and 59ad on a top surface of main canopy 50a to retain kite sizing section 70a in a folded over position as illustrated in FIGS. 9B and 9C. In FIG. 9C, struts 30aa, 30ab and 30ac are resized to the new trailing edge of kite 10a, which is, for example, defined generally by interface 54a. In FIGS. 9B and 9C, movable or foldable kite sizing section 70a is shown to be folded to a position to minimize kite area. In other embodiments, movable or foldable kite sizing section 70a may be made adjustable or infinitely adjustable as determined by the area thereof folded over main canopy 50a. Cooperating connectors may be provided over a suitable area of main canopy 50a and kite sizing section 70a to provide for such adjustability.

Figure 10A:
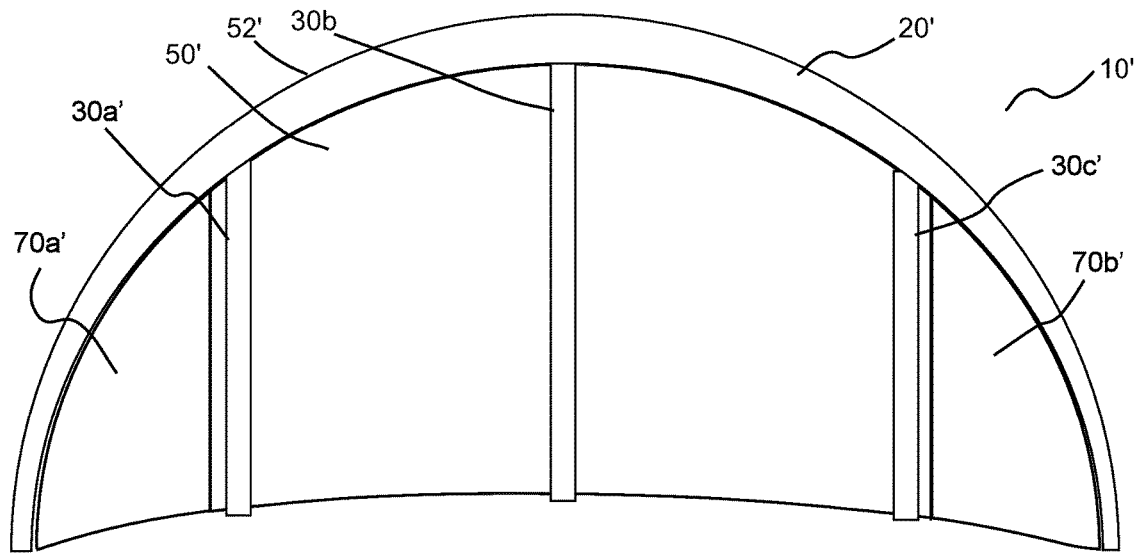
FIG. 10A illustrates a bottom schematic view of another embodiment of a kite or wing hereof with one or more kite sizing sections in operative connection with a main kite canopy.
Figure 10B:
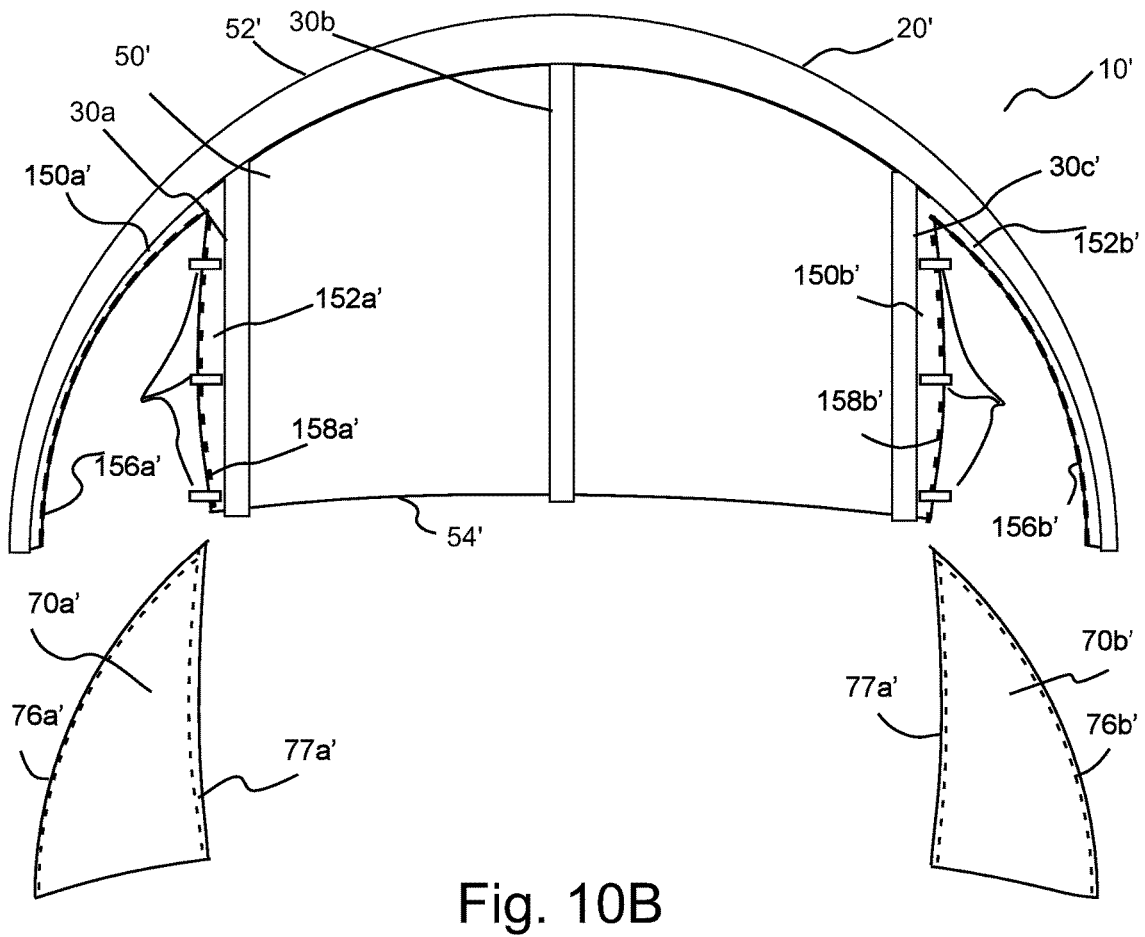
FIG. 10B illustrates a bottom schematic view of the kite of FIG. 9A with the kite sizing sections removed from operative connection with a main kite canopy.
Figure 10C:
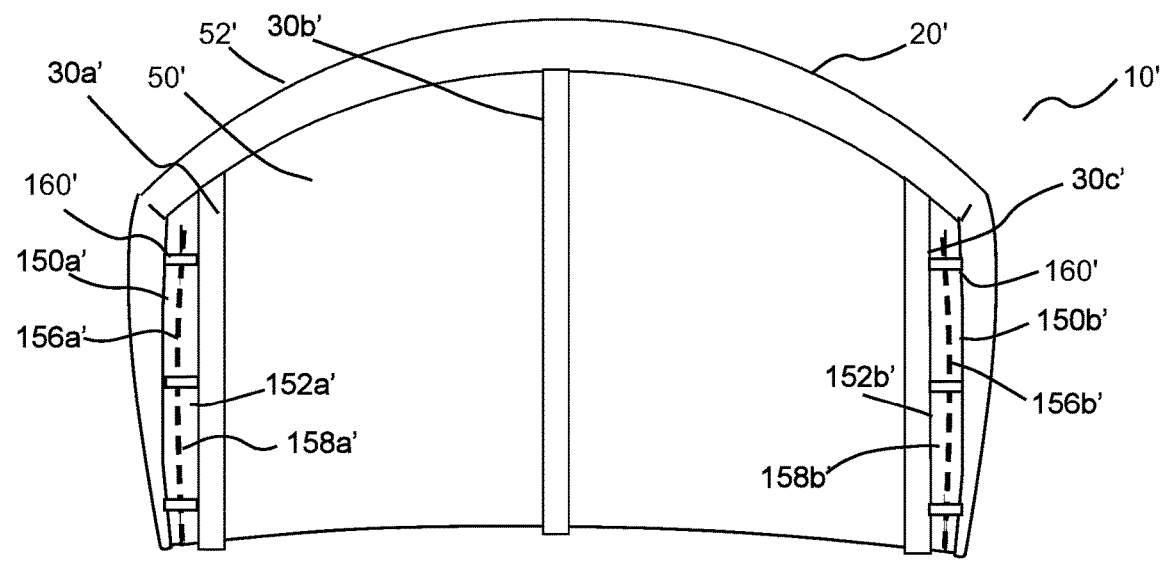
FIG. 10C illustrates a bottom schematic view of the kite of FIG. 9A with the kite sizing sections removed from operative connection with a main kite canopy and the conformation of portions of leading edge changed to conform to the resized area of the kite canopy.

In the embodiment of FIGS. 10A through 10C, main canopy 50' extends over a generally central section of kite 10', the area of which is defined approximately by the central portion of leading edge support 20', between outer struts 30a and 30c. In the vicinity of the wing tips of kite 10', as illustrated in FIG. 10A, kite 10' further includes removable sizing panels or sections 70a' and 70b'. As illustrated in FIG. 10B, in which removable sizing panel sections 70a' and 70b' are removed, kite 10' includes a relatively narrow strips or sections of material 150a', 152a' and relatively narrow strips or sections of material 150b', 152b', which are attached to the frame at the left and right sides thereof, respectively (in the orientation of FIGS. 10A through 10C). Section 150a' follows the contour of leading edge 20' and is attached to sleeve 52. Section 152a' extends along strut 30a'. A section 150b' also follows the contour of leading edge 20' and is attached to sleeve 52. Section 152b' extends along strut 30c'. One or more sections of a fastener mechanism 150a' and 152a' (for example, hook-and-loop type fattener(s), zipper(s), snap(s), magnet(s) etc.) are attached to section 156a' and 158a', respectively. Similarly, one or more sections of a fastener mechanism 156b' and 158ba' (for example, hook-and-loop type fattener(s), zipper(s), snap(s), magnet(s) etc.) are attached to section 156a' and 158a', respectively. Strips or sections of material 150a' and 150b' (as well as sections 150b' and 152b') may, for example, be formed integrally or monolithically with main canopy 50. Such sections may also be formed a separately.

As illustrated in FIG. 10B, removable kite sizing sections 70a' and 70b' include one or more sections of a fastener mechanism 76a' and 76b' (for example, hook-and-loop type fattener(s), zipper(s), snap(s), magnet(s) etc.), respectively, on the laterally outer edge thereof to cooperate with the one or more sections of fastener mechanism 156a' and 156b'. Likewise, removable kite sizing sections 70a' and 70b' include one or more sections of a fastener mechanism 77a' and 77b' (for example, hook-and-loop type fattener(s), zipper(s), snap(s), magnet(s) etc.), respectively, on the laterally inner edge thereof to cooperate with the one or more sections of fastener mechanism 158a' and 158b'.

As illustrated in FIG. 10C, leading edge support 20' may be bent or deformed at the lateral ends thereof so that the lateral ends of leading edge support 20' are generally aligned with outer struts 30a' and 30b'. To retain leading edge support 20' in this position, fastener mechanism(s) 156a' may be connected to fastener mechanism(s) 158a' and fastener mechanism(s) 156b' may be connected to fastener mechanism(s) 158b. Additional attachment mechanisms or systems such as compression straps 160' may also be provided.

Plane wings may include slats, flaps and spoilers to change the lift, drag and roll of a wing thereof. In the case of a kite wing, however, it is undesirable to add any extra weight by including such components on the wing. In a number of embodiments hereof, one or more air streams may be injected or directed from one side of a kite hereof to the other side of the kite to cause the kite wing to behave as though it air was flowing over a slat, flap or spoiler. In that manner, the air flow over the wing is altered without the requirement of an added physical object (such as a slat, flap or spoiler) and the associated weight.

The embodiment of FIGS. 10A through 10C, when adjusted in size/area as illustrated in FIG. 10C, provides for relatively small kite with a faster turning speed. Kite 10' is well suited for adjustment of smaller sized kites because the most effective portions of the kite for lift generation, the wing tips, are removed/reduced in size upon removal of kite sizing sections 70a' and 70b'. In smaller kites, the wing tips are the the primary portions of the kite that generate lift. Removing the wing tips on smaller kites is not only effective at reducing the size/are of the kite (and the pull from the kite), but also converts the kite to an optimized shape for performance.

The foregoing description and accompanying drawings set forth a number of representative embodiments at the present time. Various modifications, additions and alternative designs will, of course, become apparent to those skilled in the art in light of the foregoing teachings without departing from the scope hereof, which is indicated by the following claims rather than by the foregoing description. All changes and variations that fall within the meaning and range of equivalency of the claims are to be embraced within their scope.

What is claimed is:

1. A kite wing to power movement of a person, comprising:
   a frame comprising a leading edge support and a plurality of struts extending rearward from the leading edge support;
   a flexible main canopy comprising a leading edge attached to the leading edge support of the frame and a trailing edge; and
   at least one flexible kite sizing section adjustably attached to the flexible main canopy, wherein the at least one flexible kite sizing section is adjustable to change an area of the kite, including an area of at least a first wing tip section of the kite by adjusting a position of the trailing edge from a first position to a second position wherein a contour of the trailing edge at the second position generally parallels a contour of the trailing edge at the first position such that a normal distance between points on the contour of the trailing edge at the first position and the contour of the trailing edge at the second position vary by less than 20% from an average normal distance.

2. The kite of claim 1 wherein the leading edge support is generally arced in shape over at least a portion thereof.

3. The kite of claim 1 wherein at least one of the main canopy and the at least one kite sizing section includes at least one port therein which can be opened or closed by a user of the kite.

4. The kite of claim 1 wherein the normal distance between points on the contour of the trailing edge at the first position and the contour of the trailing edge at the second position vary by less than 10% from the average normal distance.

5. The kite of claim 1 wherein the at least one flexible kite sizing section is foldably or removably attached to the flexible main canopy to change the area of the kite.

6. The kite of claim 5 wherein at least one of the plurality of struts is adjustable in length.

7. The kite of claim 5 wherein the leading edge support is adjustable in at least one of length or conformation.

8. The kite of claim 1 wherein the at least one flexible kite sizing section is removably attached to the flexible main canopy to change the area of the kite.

9. The kite of claim 8 comprising a first flexible kite sizing section removably attachable to the main canopy at the first wing tip section of the kite and a second flexible kite sizing section removably attachable to a second wing tip section of the kite.

10. The kite of claim 8 wherein the at least one flexible kite sizing section is removably attachable to the trailing edge of the main canopy via at least one releasable fastener.

11. The kite of claim 10 wherein the at least one flexible kite sizing section extends from the first wing tip section to a second wing tip section of the kite.

12. The kite of claim 10 wherein the at least one releasable fastener comprises at least one section of hook-and-loop type fastener.

13. The kite of claim 12 wherein the at least one releasable fastener comprises at least one section of hook-and-loop type fastener extending along at least a portion of the trailing edge of the main canopy and the at least one flexible kite sizing section comprises a cooperating hook-and-loop type fastener extending along at least a portion of a forward edge thereof.

14. The kite of claim 12 further comprising a first wing tip member extending from a first end of the leading edge support and a second wing tip member extending from a second end the leading edge support, the first wing tip member and the second wing tip member being dimensioned to affect control of the kite upon removal of the at least one kite flexible sizing section.

15. The kite of claim 12 wherein the leading edge support and the plurality of struts are inflatable.

16. The kite of claim 15 wherein at least one of the plurality of struts is adjustable in length and the kite comprises at least one retainer to maintain the at least one of the plurality of struts in an adjusted length.

17. A method of altering the flight characteristics of a flexible kite wing for powering movement of a person across a surface comprising:
   providing a flexible main canopy of the wing comprising a leading edge and a trailing edge; and
   providing at least one flexible kite sizing section adjustably attached to the main canopy, wherein the at least one flexible kite sizing section is adjustable to change an area of the kite, including an area of at least a first wing tip section of the kite, by adjusting a position of the trailing edge from a first position to a second position wherein a contour of the trailing edge at the second position generally parallels a contour of the trailing edge at the first position such that a normal distance between points on the contour of the trailing edge at the first position and the contour of the trailing edge at the second position vary by less than 20% from an average normal distance.

\* \* \* \* \*